3,446,800
PROCESS FOR THE PREPARATION OF 1,3-DIHY-DRO-2H-1,4-BENZODIAZEPIN-2-ONES

Ronald J. McCaully, Malvern, Pa., assignor to American Home Products Corporation, New York, N.Y., a corporation of Delaware
No Drawing. Continuation-in-part of application Ser. No. 533,777, Mar. 14, 1966. This application Feb. 9, 1968, Ser. No. 704,277
Int. Cl. C07d *53/06;* A61l *27/00*
U.S. Cl. 260—239.3                                                   4 Claims

ABSTRACT OF THE DISCLOSURE

This invention is concerned with a process for the synthesis of 5 - aryl-1,3-dihydro-3-hydroxy-2H-1,4-benzodiazepin-2-ones by brominating 5-aryl-1,5-dihydro-2H-1,4-benzodiazepin-2-ones and then hydrolyzing the resulting bromohydrobromide salts. The products produced by the process of the invention exert anti-anxiety activity in animals, a pattern of activities possessed by psycholeptic agents.

---

This application is a continuation-in-part of application Ser. No. 533,777 filed Mar. 14, 1966 by Ronald J. McCaully, now abandoned, and entitled "A Process for the Prepartion of 1,3-Dihydro-2H-1,4-Benzodiazepin-2-Ones."

This invention relates to a novel process for the preparation of compositions of matter classified in the art of chemistry as benzodiazepines.

The present invention in its principal process aspect resides in the concept of brominating a 5-aryl-1,5-dihydro-2H-1,4-benzodiazepin-2-one followed by the displacement of bromine by water to obtain a 5-aryl-1,3-dihydro-3-hydroxy-2H-1,4-benzodiazepin-2-one.

The tangible embodiments of the known compositions prepared by this process possess the inherent general physical properties of being crystalline solids. Examination of compounds produced according to the hereinafter described process reveals upon nuclear magnetic resonance, ultraviolet and infrared spectrographic analysis, spectral data confirming the molecular structure hereinbefore set forth. For example, the C—O frequency characteristic of the oxygen attached at the 3-position is evident. The aforementioned physical characteristics, taken together with the nature of the starting materials, the mode of synthesis confirm the molecular structure of the compounds prepared by the process of this invention.

The products of the present process possess the inherent applied use characteristic of exerting anti-anxiety activity in animals, as evidenced by evaluation according to standard test procedures, a pattern of activities possessed by psycholeptic agents. For instance, 7-chloro-1,3-dihydro - 3 - hydroxy-5-phenyl-2H-1,4-benzodiazepin-2-one, is marketed under the generic name "oxazepam" as a tranquilizer for humans.

The process of the present invention, as exemplified in making a specific compound, is illustrated schematically as follows:

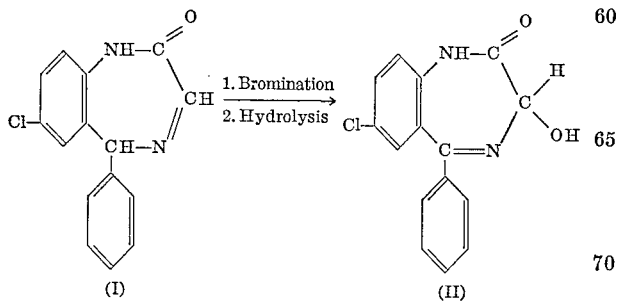

(I)                                              (II)

The process of the present invention will now be generally described so as to enable a person skilled in the art of chemistry to utilize it.

The 5-aryl - 1,5-dihydro-2H-1,4-benzodiazepin-2-ones (I) employed as starting materials in the process of this invention for the preparation of 5-aryl-1,3-dihydro-2H-1,4-benzodiazepin-2-ones (II) are prepared by the process as described in copending application, U.S. Ser. No. 528,385, entitled "1,5-Dihydro-2H-1,4-Benzodiazepin-2-ones," filed on Feb. 18, 1966, now abandoned.

A 5 - aryl-1,5-dihydro-2H-1,4-benzodiazepin-2-one is dissolved in a reaction-inert organic solvent, such as benzene, and then reacted with an allylic brominating agent, in the presence of a free radical initiator, for about five hours at room temperature. Thereafter, the hydrbromide salt of the 5-aryl-1,5-dihydro-2H-1,4-benzodiazepin-2-one is separated by filtration. Hydrolysis of the hydrobromide to the corresponding 1,3-dihydro-3-hydroxy compound is brought about by dissolving the hydrobromide in dimethylformamide and then diluting the solution with water. After the hydrolysis is complete, the desired 5-aryl-1,3-dihydro-3-hydroxy-2H-1,4-benzodiazepin - 2 - one precipitates and is separated by filtration.

By reaction-inert organic solvent as employed herein is meant an organic solvent which dissolves the reactants but will not prevent or interfere with their interaction. For example, some such solvents are benzene, methylene chloride, chloroform and carbon tetrachloride. While the preferred allylic brominating agent is N-bromosuccinimde, it will be apparent to those skilled in the art that other brominating agents may be employed, for example, those described by L. Horner and E. H. Winkelmann in W. Forest, "Newer Methods of Preparative Organic Chemistry," vol. III, p. 151–, Academic Press, New York, 1964. The free radical initiator which is preferred in the above reaction is dibenzoylperoxide, while other suitable initiators are exemplified by the diacyl peroxides, the diaryl peroxides and discrete ultraviolet radiation. The hydrolysis of the above described hydrobromide may be carried out in numerous solvents, for example, dimethylformamide, 1,2-dimethoxy-ethane, tetrahydrofuran, dioxane or dimethylsulfoxide, other equally suitable solvents will readily suggest themselves to those skilled in the art. The reaction times and temperatures employed above are not critical and simply represent convenient reaction times and temperatures consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. The amount of solvent used in the aforesaid reactions is not critical, it being only necessary to use a sufficient amount of solvent to provide a reaction medium for the particular reactants.

It will be apparent from the disclosure herein to those skilled in the art that for the purposes of this invention, certain of the atoms of the benzodiazepine starting materials could be otherwise substituted or be substituted with groups which do not interfere with the subsequent reactions. Thus at the 1-nitrogen, an alkyl (e.g. methyl, ethyl, propyl) or acyl (e.g. acetyl, propionyl) group could be present in lieu of hydrogen. At the 5-position instead of phenyl, heterocyclic aryl groups (e.g., thienyl, pyridyl, furyl) or alkyl (e.g. methyl, ethyl) can be present. The aryl group can be unsubstituted or it can be substituted with groups such as halogen, trifluoromethyl, or alkoxy or other groups which will not react under the reaction conditions. The benzo-portion can be similarly unsubstituted or substituted with groups like those specified for the aryl group.

When the starting compounds are substituted as hereinbefore recited, it will be apparent herefrom to those skilled in the art of chemistry that the final product formed in the process of the invention will bear correspondingly the same substituents. Thus, for the process of the invention and for the product produced thereby, such groups are the full equivalents of the invention as particularly claimed.

The following example illustrates the best mode contemplated by the inventor of using the claimed process of the invention:

EXAMPLE

7 - chloro-1,5-dihydro-5-phenyl-2H-1,4-benzodiazepin-2-one (920 mg., 3.40 mole) dissolved in 150 ml. of warm benzene is treated with 656 mg. (3.68 mole) of N-bromosuccinimide and 50 mg. of dibenzoylperoxide. The light orange solution is stirred for 5.25 hours at 26° C. Filtration of the reaction mixture affords 300 mg. of a yellow crystalline hydrobromide salt, M.P. 117–179° C. The hydrobromide salt (58 mg.) is then dissolved in 1.5 ml. of dimethylformamide and diluted with 4.0 ml. of warm water. Filtration of the crystalline solid which precipitates yields 28 mg. of 7-chloro-1,3-dihydro-3-hydroxy-5-phenyl-2H-1,4-benzodiazepin-2-one, M.P. 181–183° C.

The subject matter which the applicant regards as his invention is particularly pointed out and distinctly claimed as follows:

1. A process for preparing 1,3-dihydro-3-hydroxy-5-phenyl-2H-1,4-benzodiazepin - 2 - ones which comprises brominating a 1,5-dihydro-5-phenyl-2H-1,4-benzodiazepin-2-one by contact with an allylic brominating agent, in the presence of a free radical initiator, and hydrolyizng the resulting bromohydrobromide salt.

2. The process of claim 1 wherein the 1,5-dihydro-5-phenyl-2H-1,4-benzodiazepin-2-one is substituted with chlorine at the 7-position.

3. The process of claim 1 wherein:
   (a) the allylic brominating agent is N-bromosuccinimide; and
   (b) the free radical initiator is benzoylperoxide.

4. The process of claim 1 wherein:
   (a) the 1,5-dihydro-5-phenyl-2H-1,4-benzodiazepin is substituted with chlorine at the 7-position;
   (b) the allylic brominating agent is N-bromosuccinimide; and
   (c) the free radical initiator is dibenzoylperoxide.

References Cited

UNITED STATES PATENTS

| 3,371,083 | 2/1968 | Fryer et al. | 260—239.3 |
| 3,371,084 | 2/1968 | Fryer et al. | 260—239.3 |

OTHER REFERENCES

Noller: "Chemistry of Organic Compounds," 2nd ed. (Saunders) (1957), pp. 114–118.

HENRY R. JILES, *Primary Examiner.*

R. T. BOND, *Assistant Examiner.*

U.S. Cl. X.R.

424—244